Jan. 22, 1957     L. L. CUNNINGHAM     2,778,901
SPACE THERMOSTAT
Filed March 21, 1955
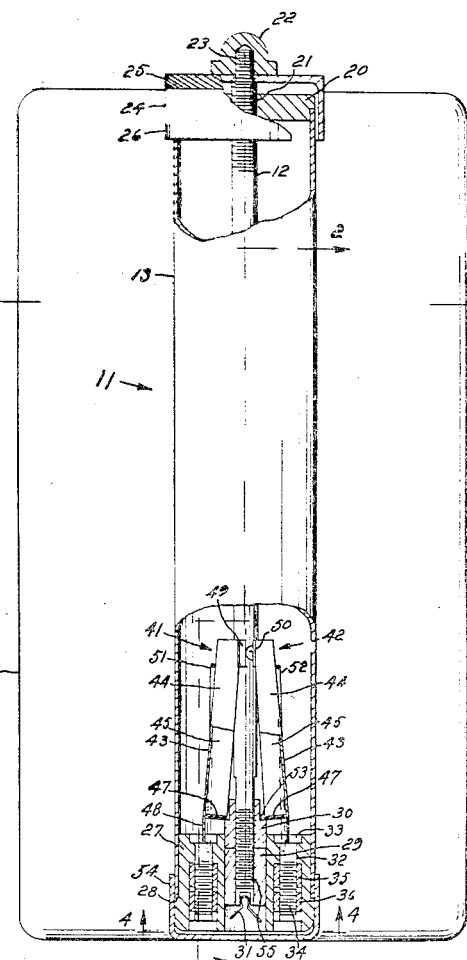
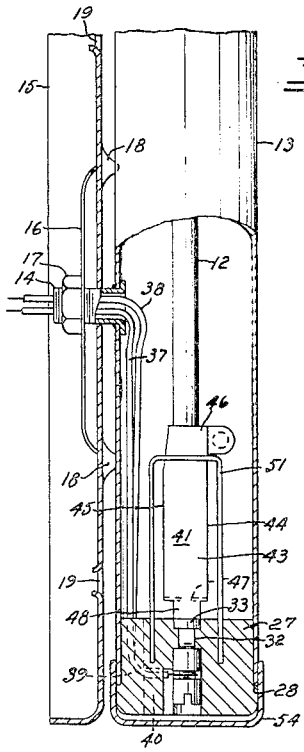
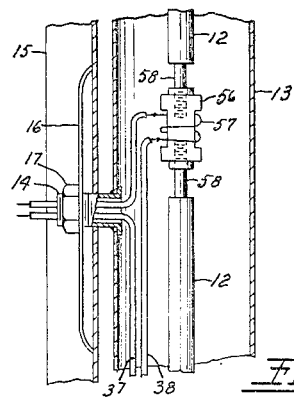
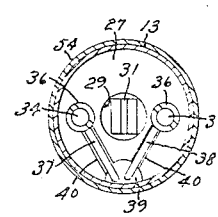
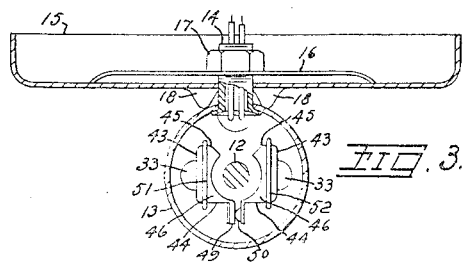
INVENTOR.
Lewis L. Cunningham
BY
AGENT United States Patent Office 2,778,901
Patented Jan. 22, 1957

2,778,901

SPACE THERMOSTAT

Lewis L. Cunningham, Los Altos, Calif.

Application March 21, 1955, Serial No. 495,559

20 Claims. (Cl. 200—137)

This invention relates generally to electric switches and more particularly to the type of electric switches having temperature sensitive operating means and known as space thermostats.

It is the general object of this invention to provide a space thermostat of high sensitivity and pleasing appearance which will be convenient to install, easy for the user to set to the temperature desired, low in first cost and having a minimum of parts.

A primary object of the invention is to provide a space thermostat in which the temperature sensitive element is exposed to the conditions affecting human comfort and in which a large switch operation force is generated in the element by a small temperature in the element.

It is well known that the temperature condition of human comfort in a space is affected by both the temperature of the ambient air in the space and the mean temperature of the walls of the space. That is to say that if both the ambient air and the average wall surface are at a temperature of seventy degrees the space will be comfortable for an occupant but if either the average wall surface temperature or ambient air temperature varies from seventy degrees the other must vary an equal amount in the opposite direction to maintain comfort conditions. This proven premise requires that the heat sensitive element of a space thermostat be exposed not only to the ambient air in the space but also to the radiation effect of the space boundary conditions.

It has been discovered that the primary object as above stated can be attained by making the thermostat of the rod and tube type in which the temperature sensitive element is a thin walled aluminum or magnesium tube surrounding an Invar temperature insensitive rod. In this form the sensitive element has a high ratio of exposed surface to mass and the surface is exposed not only to the ambient air at an appreciable distance from the wall but also to the radiation effects of all the surrounding walls. This form therefore provides a space thermostat having a minimum of thermal lag and a sensitive element sufficiently powerful to provide a switch operating movement which is linearly related to comfort temperature conditions.

In contrast the usual type of space thermostat provides a light but long and relatively flexible strip of bi-metal material for a temperature sensitive element. For both appearance and protection the bi-metal strip is placed inside a more or less perforated cover and thus entirely eliminates the boundary wall radiation as a criterion of operation. Also the cover interferes with the circulation of ambient air around the bi-metal strip and causes the strip to respond only sluggishly to ambient air temperature changes.

The bi-metal type of sensitive element usually carries at its free end the moving contact of the electric switch. To obtain the required movement of the unsupported free end the length of the bi-metal is great in proportion to its mass. The bi-metal is therefore limber and the free end subject to vibration due to movement of people or furniture in its neighborhood. Because of this the thermostat switch would chatter if some type of detent were not used but usually a magnetic detent is used to influence the switch to closed position when the movement of the bi-metal due to dropping temperature brings the contacts reasonably close together. Then to open the contacts the temperature of the space and bi-metal must be built up enough to store in the flexible bi-metal enough potential energy to break the magnetic detent. It is seen that at no time when the thermostat is within the range of desired temperature does the motion of the moving contact of a bi-metal type thermostat have a linear relation to the temperature change.

To make the bi-metal type thermostat usable it is a common practice to associate with the bi-metal an electric heater which is energized whenever the thermostat contacts are closed. Such a heater can be proportioned to give satisfactory results when the heat supply is proportioned to the heating load to give the heat supply a cycling period for which the thermostat heater is proportioned. But to have the thermostat heater proportioned for mild weather use will give excessive heat to the thermostat in colder weather when the heat supply is operating for longer periods. This excessive heating of the thermostat in colder weather causes its effective setting to droop and thus to cause the thermostat to hold a room temperature below its indicated setting at a time when the walls are colder and the thermostat for human comfort should be holding an air temperature above its setting.

It should be carefully noted that in any heat supply system for a space to be heated there will be some lag of heat supply after the thermostat contacts are closed and some continued supply of heat after the thermostat contacts are opened. In systems having low heat storage capacity and quick response no compensation of the thermostat to take this lag or overshoot into account is required. In systems of higher heat storage capacity and more sluggish response some compensation of the thermostat is desirable. Suppliers of bi-metal type thermostats which because of their magnetic detents and jerky action require that compensation of the above thermostat heating type be used are quick to lay the use of heat in the thermostat to the need for compensation for the sluggish heating system. But only a small part of the heat used is required for system compensation. Most of the heat used is required to operate the thermostat and as above shown the effect of this excessive heat on the big-metal type of thermostat is to cause effective setting droop and underheating of the space in the colder weather when in reality a higher air temperature is required for comfort.

Because the thermostat of this invention acts positively and linearly with temperature change no thermostat heat is required with supply systems having low heat storage capacity and quick response. With more sluggish systems of relatively large heat storage capacity a very small amount of heat may be used to advantage.

It is a second object of this invention to provide a space thermostat which requires no supplementary heating while its contacts are closed to operate the thermostat with a desired control differential.

It is a third object to provide such a thermostat to which a small amount of heat may be supplied in a unique way during the time its contacts are closed to compensate for the thermal lag of the heat supply system.

It is a fourth object to provide such a thermostat in which the system thermal lag compensating heat supplied to the thermostat first acts as a thermal detent to prevent too rapid cycling of the system and in which the effect on the system operation of the compensating heat supplied to the thermostat is not cumulative after a design time in each heat supply cycle. To differentiate the method of compensating heat application to the thermostat of this invention from that used in the commonly found bi-metal type thermostat it should be remembered that in the bi-metal type thermostat compensating heat application is made direct to the bi-metal element continuously while the contacts are closed. In the present thermostat when it is desired to add a small amount of compensating heat to the thermostat because of a sluggish heat supply system a short spool of temperature sensitive metal like that of the tube is inserted in the invar temperature insensitive rod within the tube and a small electric heating wire in the thermostat circuit is wound on the spool. With this arrangement when the thermostat contacts close and the spool is heated it expands and lengthens the rod which closes the thermostat contacts tighter together. But the rod and spool are entirely surrounded by the tube and radiate heat to the tube so that in a time limited by the design the spool radiates heat to the tube at the rate heat is supplied to the spool and the rate of increase of length of the tube becomes greater than the rate of increase of length of the rod and spool combination. Thus in the present thermostat the heat compensation of the thermostat is first negative to assure a minimum operating time of the heat supply system each operating cycle and then becomes positive to compensate for the thermal lag of the system.

It is a fifth object to provide such a thermostat in which the heat sensitive element exposed to the comfort criteria conditions is also the supporting and protecting case for the other thermostat parts.

It is a sixth object to provide such a thermostat with a base to which it is pivoted for temporary displacement without dismantling during installation.

It is a seventh object to provide such a thermostat with a base in the form of a wall cover for a standard wiring conduit box.

It is an eighth object to make such a thermostat in which one end of the rod is secured to a cap for the tube, the cap being inscribed about its outer rim with a setting scale for the thermostat and the tube being marked on its front side with an index for the setting scale.

It is a ninth object to make such a thermostat in which the rod is threaded at opposite ends with threads of the same hand but of different pitch, the top end of the rod being threadedly engaged with a stationary hub in the tube and the bottom end of the rod being threadedly engaged with an adjusting nut rotatable against a pair of abutments flexibly carried on the tube and on which abutments the contact members of the switch are carried.

It is a tenth object to provide such a sensitive thermostat in which the pair of abutments are each carried on one end of one of a pair of relatively long levers on the other ends of which the respective switch contacts are mounted.

It is an eleventh object to provide a rod and tube thermostat having a simple lever system for multiplying the differential movement of the rod and to provide such a lever system which requires a minimum of radial space within the tube.

It is a twelfth object to provide such a thermostat in which a differential multiplying lever may be of any desired length up to the approximate length of the tube.

It is a thirteenth object to provide such a thermostat in which the effective differential multiplication is increased by making each of the switch contacts a moving contact carried on its individual lever system.

How these and other objects are attained is explained in the following description referring to the attached drawing in which—

Fig. 1 is a front elevation of the thermostat of this invention with outer parts broken away to show interior parts.

Fig. 2 is a fragmentary side elevation of the thermostat of Fig. 1.

Fig. 3 is a transverse section of the thermostat of Fig. 1 along the line 3—3.

Fig. 4 is a fragmentary view of the thermostat of Fig. 1 along the line 4—4.

Fig. 5 is a fragmentary view taken similarly to Fig. 2 of a modified form of the thermostat of Fig. 1.

Like numerals of reference refer to like parts in the several figures of the drawing.

Referring now to the drawing there is shown generally at 11 a rod and tube type thermostat having a central rod 12 of Invar metal which over the temperature range in which the thermostat is used is not responsive in linear dimensions to temperature change. Tube 13 is made of aluminum, magnesium, or other material having a relatively high temperature coefficient of expansion. Hollow bolt 14 inserted from the inside of tube 13 through a hole formed in tube 13 as shown extends through a hole formed as shown in mounting base 15 and through spring finger washer 16. Nut 17 threaded onto hollow bolt 14 yieldingly secures thermostat 11 to base plate 15. Thermostat tube 13 is angularly positioned vertically on plate 15 by four spaced bosses 18 formed on base 15. By pulling thermostat 13 away from base 15 against the bias of spring washer 16 thermostat 13 can be rotated out of its cradle formed by bosses 18 to expose screw holes 19 formed in base 15 for the insertion there through of a pair of flat head machine screws, not shown, to secure base 15 to a wiring conduit box, not shown, fitted into the room wall.

Rod 12 near its upper end at 21 is threadedly engaged with hub disk 20 secured into tube 13. Nut 22 threaded onto the reduced diameter top end of rod 12 at 23 secures on rod 12 cap 24 knurled at 25 to form a non-slip finger surface and marked at 26 with a temperature scale. On the front side of tube 13 adjacent the lower edge of cap 24 a scale index, not shown, is formed to indicate on scale 26 the temperature desired to be held in the space by the heat supply means not shown, under the control of the thermostat. Insulating and dimentionally stable ceramic plug 27 is inserted into the lower end of tube 13 to the shoulder 28 formed on plug 27.

Guided in a central axial hole formed in plug 27 are cylindrical nut 29 and hollow ceramic plug 30 through which the lower end of rod 12 extends threadedly at 55 to engage nut 29. Nut 29 is slotted at its lower end to receive as shown the central position of spring clip 31 formed from a rectangular strip of resilient metal. With its mid portion engaging nut 29 the rectangular end corners of clip 31 resiliently engage the wall of the axial hole formed in plug 27 and prevent nut 29 from turning when rod 12 is turned as cap 25 is turned to set the thermostat.

Diametrically spaced longitudinal holes 32 formed through plug 27 are countersunk at their top ends to receive the slotted heads 33 of screws 34 and countersunk at their bottom ends to receive slotted nuts 35 for securing screws 34 in place and slotted nuts 36 for the ends of wires 37, 38 to their respective terminal screws 34. Plug 27 is vertically grooved at 39 and horizontally grooved at 40 to provide channels for wires 37, 38.

Lever arms 41 and 42 are of spring bronze sheet material each folded and formed to have a back sheet 43, a front side sheet 44, a rear side sheet 45, a top end sheet 46 and an abutment 47 formed near the bottom end of the arm. Back sheets 43 are reduced in width at their bottom ends, inserted respectively into the slotted heads of screws 34 and silver soldered in place. The lower end tangs 48 of back sheets 43 of lever arms 41 and 42 thus form resilient hinged connections between screws 34 and lever arms 41 and 42 respectively. The lower ends of the front and back side sheets 44, 45 of each of the arms 41, 42 are folded inwardly and reinforced with an abutment strip, silver soldered thereto to form abutments 47. The front side sheets near their upper ends are folded outwardly to support switch contacts 49, 50 respectively.

Long piano wire staples 51, 52 set into ceramic plug 27 as shown respectively resiliently bias arms 41, 42 towards their positions of closure of contacts 49, 50.

The operation of the form of this invention shown in Figs. 1, 2 and 3 is as follows. To calibrate the thermostat it is placed in a space of known and controlled constant temperature and is kept there long enough for all parts of the instrument to arrive at the known temperature. Wires 37, 38 are connected in series in a low power indicating light circuit. Spring clip 31 is removed from its engagement with adjusting nut 29 and the interior of plug 27. Cap 24 is turned until the index on tube 12 coincides with the known temperature mark on the scale 26 on cap 24. Adjusting nut 29 is backed off on rod 12 until the indicating light in the test circuit lights. Then adjusting nut 29 is carefully screwed upward on rod 12 against ceramic plug 30 until the annular shoulder abutment 53 formed on plug 30 engages the abutments 47 on lever arms 41 and 42 and further until the upward movement of plug 30 rotates the lever arms 41 and 42 about their spring hinges 48 and contacts 49, 50 open to shut off the test light. Spring clip 31 is then replaced to the position shown in the drawing to prevent any disturbance of the calibration by relative motion of adjusting nut 29 and plug 27. Lower cap 54 is then pressed in place securely on plug 27 and tube 13.

In use the thermostat is mounted at a desired location in the space whose temperature is to be controlled and the wires 37, 38 are connected in the manner well known in the art to a relay or controller for the temperature changing means provided for the space. The occupant of the space turns the cap 24 to set on scale 26 the temperature desired opposite the index on tube 13. Abutment 53 on small ceramic plug 30 vertically positioned by the turning of rod 12 by scale cap 24 positions abutments 47 on contact lever arms 41, 42 and thereby put contacts 49, 50 into open circuit position if the desired space temperature is attained or in closed circuit position to start the temperature changing means if the desired space temperature is not attained. Usually such a thermostat is used to control a temperature changing means which operates on a closure of the thermostat contacts one on the other to start a supply of heat to the space and it is for that purpose that the invention is here illustrated. Thus, after the thermostat has been set to a desired temperature and the thermostat contacts are open, the space is warm enough but later will cool and tube 13 as it cools will contract in length while rod 12 does not shorten. As tube 13 cools and contracts plug 27 is drawn upward allowing spring staples 51, 52 to move lever arms 41, 42 about their hinges 48 without hindrance from abutment 53 acting on abutments 47 and the contacts will close to start the heat supply. Then as heat is supplied to the space, tube 13 warms up and expands pushing ceramic plug 27 downward and taking with it lever arms 41, 42 whose abutments 47 encounter abutment 53 on small plug 30. Lever arms are therefore rotated outwardly and when the desired temperature in the space is reached the contacts are opened to stop the heat supply.

It should be particularly noted that in operation there is very little mechanical stress placed on the temperature responsive elements for the only restraining forces in operation to combat their relative movement are those imposed by the wire staple springs 51, 52. Also with the arrangement shown the sensitivity of the instrument in design can be increased as desired merely by making the lever arms 41, 42 of a longer length without other modification. Again the present design takes advantage of the movement of both lever arms 41, 42 to attain great sensitivity with relatively short levers as shown. To get close setting sensitivity of the thermostat, control threads 21 at the top of rod 12 and control threads 55 at the bottom of rod 12 are formed with slightly different pitch but of the same hand. Thus in one form in which this invention has been practiced threads 21 are formed with a pitch of 40 threads to the inch and threads 55 are formed with a pitch of 48 threads per inch. The effective lengthening or shortening of rod 12 for one turn of adjusting cap 24 is therefore about four thousandths of an inch.

In Fig. 5 is shown the modification of the thermostat of this invention which not only assures a minimum length of heat supply operation each time the thermostat contacts close but also operates to compensate the system control for sluggishness of the heat supply system. In this form it is seen that a short intermediate section of rod 12 has been removed and the adjacent ends of the two parts of rod 12 threaded to engage the threaded axial bore of spool 56. Also inserted in wire 38 is a short section of electrically insulated resistance wire 57 wound on spool 56. Spool 56 is of temperature sensitive metal like tube 13.

Heat from wire 57 given up to spool 56 lengthens spool 56 proportionately and in effect lengthens rod 12 to allow staples 51, 52 to press harder on contacts 49, 50. But spool 56 loses the heat supplied to it by wire 57 both by direct radiation to the internal surface of tube 13 and by conduction to the two parts of rod 12. If desired the conduction of heat from spool 56 to the two parts of rod 12 can be lessened by necking either of the parts as at 58 to reduce the heat conduction cross section of them. Again if a greater heat loss from spool 56 to the upper portion of rod 12 which is in full metallic contact with tube 13 through hub 20 is desired, the upper part of rod 12 can be made larger in cross section and/or the spool 56 can be moved higher on rod 12 by making the upper part of rod 12 shorter and the lower part larger. It is seen that by design the rapidity of heat transfer to tube 13 from spool 56 can be controlled to suit the general purpose for which the thermostat is to be used. As previously explained heat supplied to spool 56 by wire 57 will raise the temperature of spool 56 to an added temperature determined by design at which heat is conducted or radiated from rod 12 and spool 56 to tube 13 as fast as it is supplied to spool 56. In ordinary space heating use as in a residence the temperature of spool 56 will be raised only a few degrees and the temperature of tube 13 at steady state conditions will be raised by the heat radiated and conducted to it from spool 56 not over a degree. Since spool 56 is much shorter than tube 13, by design the steady state condition can be fixed so that the differential lengths of rod 12 and tube 13 will be the same as though the heater were not used but the tube 13 through the combination of radiant exchange with its surroundings and the increase of ambient air temperature will have to be raised in temperature in the order of one degree to open the thermostat contacts.

With rod 12 consisting of two lengths of Invar having substantially no thermal coefficient of expansion and a short length of aluminum or magnesium, either of which has a high coefficient of thermal expansion, it is apparent that the thermal coefficient of expansion of rod 12 as a whole will be small but appreciable and that this composite structure of rod 12 could be replaced by a uniform single piece rod 12 structure of one of the stainless steel materials having the same overall thermal coefficient of expansion. In this case the resistance wire 57 could be wound on rod 12 and positioned therealong to proportion the heat transferred from rod 12 to tube 13 by radiation and conduction. And, of course, if desired, rod 12 itself could be insulatedly supported and function as the resistance element 57.

It is seen that the thermostat of this invention by the proportioning of the parts not only can be made as sensitive as desired but also can be proportioned to compensate for a sluggish heat supply means to a space to be temperature controlled for human comfort.

Having thus recited some of the objects of my invention, illustrated and described two forms in which my invention may be practiced and described their operation, I claim:

1. A space thermostat comprising a rigid tube of temperature sensitive metal, an axially threaded hub secured in one end of said tube, an insulating plug secured in the other end of said tube, said plug having an axial hole formed therethrough, an abutment plug guided in said axial hole, said abutment plug having an abutment shoulder formed thereon and an axial bore formed therethrough, a temperature insensitive rod within said tube axially aligned therewith, said rod being formed with threads of different pitch around its respective ends, one end of said rod being threadedly engaged through said hub, a nut threadedly engaged on the other end of said rod to support said abutment plug, a pair of lever arms extending longitudinally within said tube on opposite sides of said rod, one end of each of said arms being hingedly supported on said insulating plug, a pair of switch contacts carried one each on the respective other ends of said arms, means biasing said lever arms towards the closed position of said switch contacts, each of said arms having abutments formed thereon in engagement with said abutment shoulder on said abutment plug to restrain said biasing means, a cap for said one end of said tube, said cap being secured on said rod outside said hub, a dial on said cap, an index for said dial on said tube, said nut being rotatable on said rod to calibrate said dial, means adapted to prevent the rotation of said nut after said dial is calibrated and said rod being rotatable in said hub and said nut by said cap for setting said thermostat.

2. The thermostat of claim 1 including a wall plate pivotally secured thereto on an axis normal to the axis of said tube and normal to the face of said plate.

3. The thermostat of claim 1 including a hollow bolt secured thereon near its mid length and extending normally therefrom, a wall plate extending parallel to said thermostat and spaced therefrom, said hollow bolt extending through a hole formed in said plate and a nut on said bolt to secure said plate to said thermostat.

4. The thermostat of claim 1 including a hollow bolt secured thereon near its mid length and extending normally therefrom, a wall plate extending parallel to said thermostat and have a hole formed centrally therethrough to receive said bolt, a cradle for said thermostat formed on the thermostat side of said plate, a spring finger washer on said bolt on the side of said plate away from said thermostat and a nut on said bolt adapted to secure said spring washer and said plate to said thermostat, said spring washer being sufficiently yielding to allow said thermostat to be pulled away from said plate to clear said cradle and pivot on said plate around said bolt.

5. The thermostat of claim 4 in which said wall plate is in the form of a wiring conduit box cover with a pair of vertically aligned countersunk screw holes formed therethrough for the attachment of said cover to a conduit box by a pair of screws and said cradle on said cover is aligned to hold said thermostat on the line of said screws to hide said screws when said thermostat is in operating position but to expose said screws for manipulation thereof when said thermostat is rotated on said bolt out of said cradle.

6. The thermostat of claim 1 including a hollow bolt secured thereon near its mid length and extending normally therefrom, a pair of thermostat terminals set in said insulating plugs in said tube, said terminals being respectively electrically connected to said lever arms, and a pair of insulated wires leading into said tube through said bolt and connected to said terminals.

7. The thermostat of claim 6 in which said rod comprises two axially aligned parts connected by a short length of temperature sensitive metal and one of said wires has a resistance element secured in series therewith, said resistance element being positioned within said tube adjacent said short length of temperature sensitive metal.

8. The thermostat of claim 6 in which said rod comprises a structure having a thermal coefficient of expansion materially less than the thermal coefficient of expansion of said tube and one of said wires has a resistance element secured in series therewith, said resistance element being positioned within said tube adjacent said structure.

9. A space thermostat comprising an electric switch and a temperature sensitive operator therefor, said operator comprising an outer supporting and enclosing frame for the other parts of said thermostat and a rod axially supported in said frame with one end of said rod secured to the adjacent one end of said frame, the other end of said rod being supported in the other end of said frame for free axial movement relative thereto, said switch comprising a pair of elongated contact arms hingedly supported within said frame on said other end thereof on either side of said rod and generally parallel thereto, said switch arms having switch contacts cooperatively secure on their free ends, said frame having a substantially greater thermal coefficient of expansion than said rod, and said thermostat including means operable by the temperature controlled differential axial motion of said other ends of said rod and said frame to rock said contact arms into and out of the contact position of said contacts carried at their free ends.

10. A space thermostat comprising an elongated metal frame having a relatively high thermal coefficient of expansion, a rod having a relatively lower thermal coefficient of expansion than said frame, said rod being secured at one end to one end of said frame, said rod being supported at its other end in the other end of said frame for free longitudinal movement relative thereto, a pair of switch contact arms hingedly supported on said other end of said frame to extend toward said one end thereof, the extending ends of each of said contact arms having a respective switch contact formed thereon and cooperating abutment means associated with said rod and said contact arms adapted on a change of ambient temperature and a consequent relative longitudinal movement of said other end of said frame and said other end of said rod variably to rock said switch arms and transversely position one of said switch contacts with respect to the other of said switch contacts.

11. A space thermostat comprising an elongated metal frame having a relatively high thermal coefficient of expansion, a rod having a relatively lower thermal coefficient of expansion than said frame, securing means securing one end of said rod to one end of said frame, means guiding the other end of said rod in the other end of said frame for free axial movement relative thereto, a switch contact arm hingedly supported in said other end of said frame to extend toward said one end of said frame, the free end of said contact arm being formed with a first switch contact thereon, a second switch contact supported on said frame adjacent said first switch contact and cooperating means associated with said contact arm and said rod adapted on a change of temperature of said frame and a consequent relative longitudinal movement of said other end of said frame with respect to said other end of said rod variably to rock said contact arm variably to position said first switch contact with respect to said other switch contact.

12. An electric switch comprising a base with a cylindrical hole formed therein, a switch operating means supported in said hole for axial movement therealong, a switch arm hingedly secured to said base to extend therefrom substantially parallel to the axis of said hole, a first switch contact on the free end of said switch arm facing transversely thereof, a second switch contact, means on said base supporting said second switch contact adjacent said first switch contact, means biasing said first switch contact towards said second switch contact, abutment faces cooperatively formed on said switch arm and said operating means, said abutment faces being substantially normal to the axis of said hole whereby as said operating means is moved axially of said hole to increase the pressure on said abutment faces said first switch contact will be moved away from said second switch contact with a motion amplification determined by the ratio of the axial distance between said first contact and the hinge point of said switch arm on said base to the distance normal to said axis between said hinges point and the abutments surface on said operating means.

13. A space thermostat comprising a cylindrical metal frame, a rod supported axially in said frame, said frame and said rod having relatively different coefficients of thermal expansion, securing means for securing one end of said rod to one end of said frame, guiding means for guiding the other end of said rod in the other end of said frame for free axial movement relative thereto, a switch contact arm hingedly supported in said other end of said frame to extend towards said one end of said frame, the free end of said contact arm being formed with a first switch contact thereon, a second switch contact supported on said frame adjacent said first switch contact, means biasing said switch contact arm towards its position of contact of said first switch contact with said second switch, contact operating means for said contact arm carried on said other end of said rod, an abutment surface formed on said contact arm substantially normal to the axis of said rod and near the hinged end of said contact arm, abutment means formed on said operating means to abut said abutment surface and restrain said biasing means whereby on a change of temperature of said rod and tube and a consequent relative axial movement of the said other ends thereof the movement of said first switch contact normal to the axis of said rod and tube will be amplified over said axial movement in the ratio of the axial distance between said first contact and the hinged axis of said contact arm to the distance normal to the axis of said rod and tube from said hinge axis to the point of engagements of said abutment means with said abutment surface.

14. The thermostat of claim 13 including a wall plate pivotally secured thereto on an axis normal to the axis of said tube and normal to the face of said plate.

15. The thermostat of claim 13 including a hollow bolt secured thereon near its midlength and extending normally therefrom, a wall plate extending parallel to said thermostat and spaced therefrom, said hollow bolt extending through a hole formed in said plate and a nut on said bolt to secure said plate to said thermostat.

16. A thermostat comprising a tubular case with an electric switch therein, means including said tubular case for operating said switch in response to variations in ambient temperature, said tubular case having a hollow bolt secured thereon near its midlength and extending normally therefrom, a wall plate extending parallel to said tubular case, said wall plate being formed with a hole therethrough to receive said bolt, a cradle for said tubular case formed on the side of said plate adjacent said case and means resilient longitudinally of said bolt for securing said bolt to said plate whereby when said case is aligned with said cradle and released said resilient means will retain said case alined in said cradle and when said case is pulled away from said plate said case can be rotated about the axis of said hollow bolt and released to a position out of alinement with said cradle.

17. The thermostat of claim 16 in which said wall plate is formed with a hole for a wall mounting screw on the centerline of said cradle whereby when said case is held alined in said cradle said screw will be inaccessible and whereby when said case is out of alinement with said cradle said screw will be accessible.

18. The thermostat of claim 16 including a terminal wire extending from said electric switch through said hollow bolt to the outside of said thermostat.

19. The thermostat of claim 13 in which said rod comprises two axially alined parts connected by a short length of temperature sensitive metal and said thermostat includes a length of resistance wire in series with said switch contacts, said resistance wire being positioned within said tubular case adjacent said short length of temperature sensitive metal.

20. The thermostat of claim 13 in which said rod comprises a structure having a thermal co-efficient of expansion materially less than that of said tubular case, and said thermostat includes a resistance element in series with said switch contacts, said resistance element being positioned within said tubular case adjacent said rod structure.

References Cited in the file of this patent

UNITED STATES PATENTS

| | | |
|---|---|---|
| 1,732,295 | Aichele | Oct. 22, 1929 |
| 1,940,300 | Gerdien et al. | Dec. 19, 1933 |
| 2,307,867 | Smith | Jan. 12, 1943 |